Jan. 14, 1958    A. M. GOODLOE    2,819,800
FILTERING APPARATUS AND FILTER UNIT THEREFOR
Filed Oct. 8, 1954    2 Sheets-Sheet 1

INVENTOR.
Alfred M. Goodloe,
BY George D. Richards
Attorney

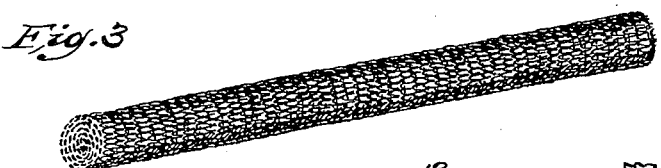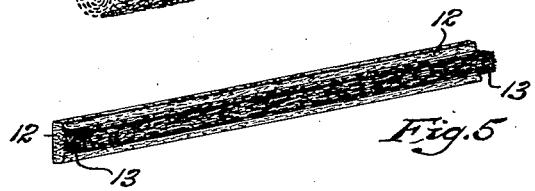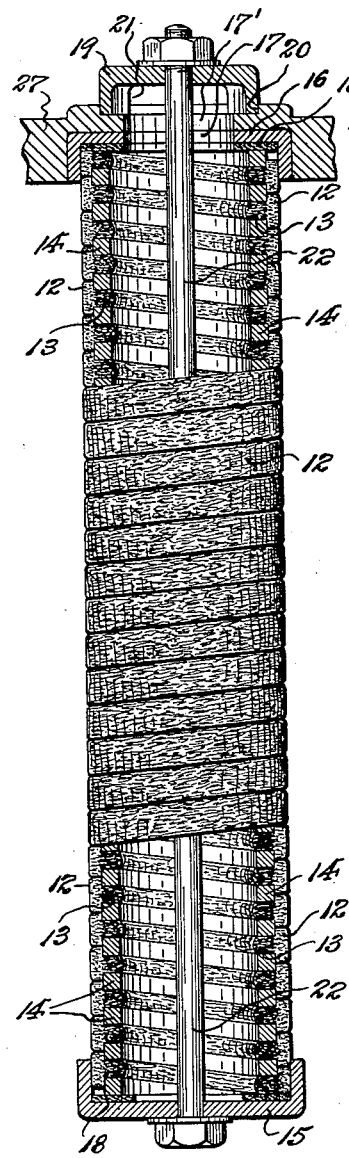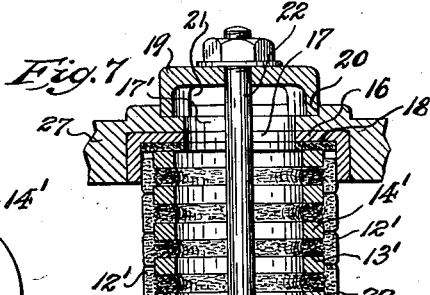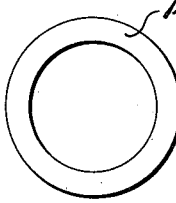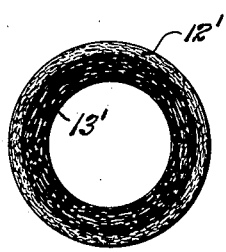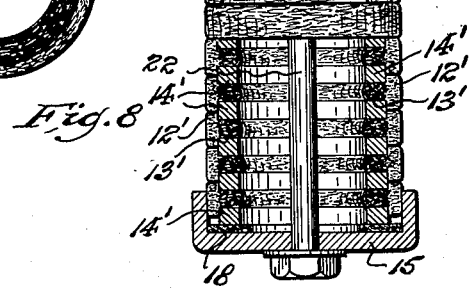

United States Patent Office 2,819,800
Patented Jan. 14, 1958

2,819,800

FILTERING APPARATUS AND FILTER UNIT THEREFOR

Alfred M. Goodloe, Westfield, N. J., assignor, by mesne assignments, to Metal Textile Corporation, a corporation of Delaware Application October 8, 1954, Serial No. 461,057

6 Claims. (Cl. 210—497)

This invention relates to fluid filtering apparatus, and to a filter unit of novel construction, one or more of which can be used in a filtering apparatus between the intake chamber and the discharge chamber thereof.

An object of the invention is to provide an interstitial or foraminous filtering medium produced from compressed knitted, woven or felted filamentary or fibrous material and formed to provide an outer section of relatively coarse porosity at its fluid intake side and an inner section of relatively fine porosity at its fluid discharge side, together with means to firmly and securely support a substantial quantity or length of said filtering medium in such manner as to provide a tubular filter unit of selected diameter and length.

Another object of the invention is to provide a filter unit wherein the filtering medium comprises a foraminous linear formation of compressed knitted, woven or felted filamentary or fibrous material, substantially T-shape in cross-section and of suitable length according to the size of filter unit desired, the transverse outer or intake section of said filtering medium being of relatively coarse porosity and the longitudinal inner or discharge section being of relatively fine porosity; the filtering medium so formed being wound upon and along a spiral supporting spring member so that the inner discharge section is entered between the helices of the spring member and is tensionally and securely gripped by adjacent helices thereof, while said outer intake section is disposed externally of said supporting spring member so as to span the helices thereof by which the inner discharge section is gripped; means being provided to close one end of the resulting tubular structure and discharge means being provided to lead out of the opposite end of said tubular structure.

The invention has for a further object to provide a filtering medium of the character above set forth which is produced from knitted metallic wire mesh rolled or folded upon itself into a linear formation, and then compressed or calendered to the desired cross-sectional T-shape, whereby to provide the outer intake section of coarse porosity or more open interstitial structure and the inner discharge section of relatively fine porosity or more closed interstitial structure.

A still further object of this invention is to provide a fluid filtering apparatus having an intake chamber and a discharge chamber with intermediate means for supporting, in communication between said chambers, one or more of the aforesaid filter units.

The above and other objects will be understood from a reading of the following detailed description of this invention in connection with the accompanying drawings, in which:

Fig. 1 is a vertical longitudinal section showing a filtering apparatus equipped with a plurality of filter units according to this invention, one said unit being shown in longitudinal section with parts in elevation, and other said units being shown in side elevation; and Fig. 2 is a horizontal sectional view, taken on line 2—2 in Fig. 1.

Fig. 3 is a fragmentary perspective view of an initial linear formation of rolled knitted metallic wire mesh before compressing or calendering the same into a preferred form of filtering medium according to this invention; Fig. 4 is a fragmentary view showing the process of compressing or calendering the initial formation of Fig. 1 into said preferred form of filtering medium; and Fig. 5 is a fragmentary perspective view of said preferred form of filtering medium produced by the compressing or calendering process.

Fig. 6 is a longitudinal sectional view, in part elevation, showing a preferred form and construction of filter unit according to this invention for use in fluid filtering apparatus.

Fig. 7 is a longitudinal sectional view, in part elevation, showing a modified form and construction of filter unit according to this invention for use in fluid filtering apparatus; Fig. 8 is a plan view of a modified form of filtering medium for the filter unit structure of Fig.. 7; and Fig. 9 is a plan view of a filtering medium supporting element for said filter unit structure of Fig.. 7.

Similar characters of reference are employed in the above described views to indicate corresponding parts.

Figure 1:
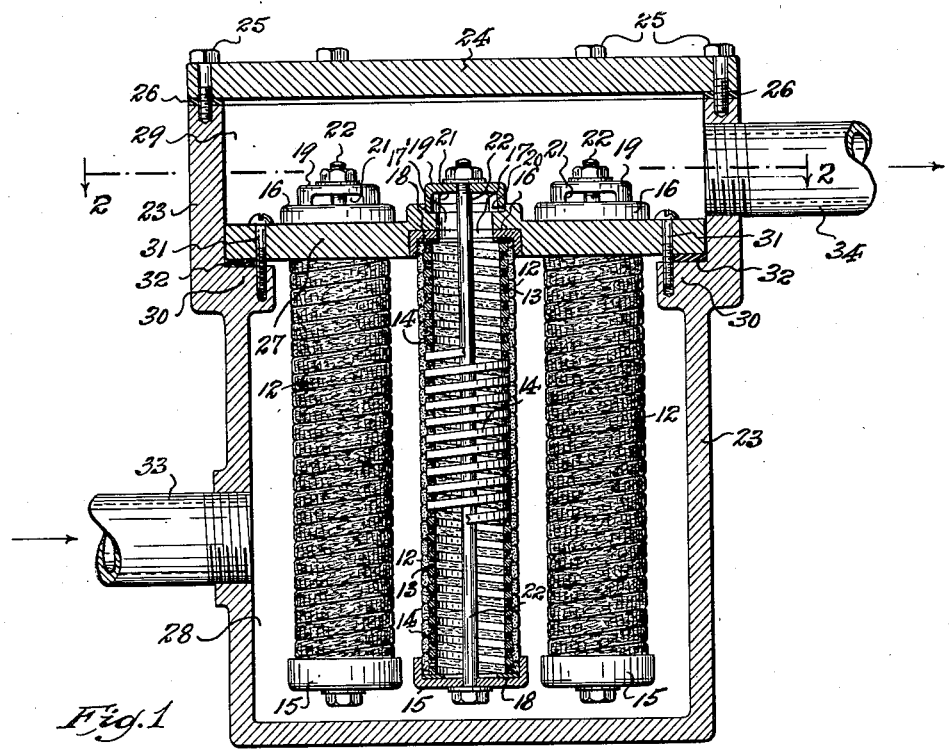

In a preferred form of filter unit, as shown in Figs. 1 and 6, the filtering medium may selectively comprise a foraminous flexible linear formation of compressed knitted, woven or felted metallic, textile or synthetic filamentary or fibrous material, such linear formation being adapted to be wound upon and along a spiral supporting spring member intermediate the helices thereof.

Although, under the broader aspects of this invention, said filtering medium of linear formation may be selectively produced from various kinds of filamentary or fibrous material, as may best be suited for filtering effect upon given fluid or fluids, a material which is deemed preferable for production of the filtering medium of such character as to be well adapted for general use, is produced from a metallic mesh fabric knitted from suitable metallic or metallic alloy wire of selected gauge size. The fabric may be either flat or tubular knit, and may be of selected loop size. Such preferred form of the filtering medium is produced as follows:

A suitable length and width of the knitted metallic wire mesh fabric is rolled or folded upon itself into an initial linear formation, such as shown in Fig. 3. This initial linear formation is then passed between opposed calendering rolls 10 and 11 (see Fig. 4) which are of stepped peripheral shape, whereby to so mold and compress said initial linear formation as to form therefrom a suitable length of foraminous filtering medium body which is substantially T-shape in cross-section. By the application of compressing force, effected by the calendering rolls 11 and 12, upon the initial linear formation, the filaments of the wire mesh loops of the fabric are deformed and interlocked together, so as to form a filtering medium body which possesses a foraminous or porous structure well adapted, in use, to very effectively perform the desired filtering function upon fluid passing therethrough.

The thus formed filtering medium provides a flexible unitary foraminous body comprising two sections, viz., an outer section 12, formed between the minor diametrical portions of the calendering rolls, which produces the cross bar or transverse portion of the T-shape cross-section, and an inner section 13, formed between the major diametrical portions of the calendering rolls, which produces the leg or longitudinal portion of the T-shape cross-section. It will be obvious that said outer section 12 will be less densely compressed by the portions of the calendering rolls of minor diameter, while said inner section 13 will be more densely compressed by the portions of the calendering rolls of major diameter. By reason of this, said outer section 12, which, in use, forms the intake section of the filtering medium, will be of relatively coarse porosity or of more open interstitial structure, while the inner section 13, which, in use, forms the discharge section of the filtering medium, will be of relatively fine porosity or of more closed interstitial structure.

Referring now more particularly to Figs. 1 and 6, the filter unit incorporating the above described filtering medium comprises a supporting spiral spring member 14 of suitable diameter, length and pitch. Said supporting spring member 14 is preferably made from material of square or other polygonal cross-section, although, if desired, it may be made from material of round or other non-polygonal cross-section.

To assemble the filtering medium body in supported operative relation to the spring member 14, the latter is temporarily held in somewhat longitudinally distended condition, whereupon the filtering medium body is wound externally about and along said spring member so that the inner discharge section 13 of the former is entered between the helices of the latter from one end thereof to the other, while the outer intake section 12 of the filter medium body is disposed externally of the spring member so as to span the helices thereof between which the inner discharge section 13 is entered. The filtering medium body having been thus assembled with and so as to be supported or carried by the spring member 14, the latter is released from temporary distention and allowed to contract longitudinally, so that its helices close upon and strongly grip the inner discharge section 13 disposed therebetween, thereby securely retaining the filtering medium body in operative assembly with and in supported relation to the carrying spring member 14. The thus assembled filtering medium and supporting spring member forms a tubular filter unit body.

The lower end of the tubular filter unit body is closed by a skirted bottom end cap 15 which telescopes thereover. Similarly, the upper end of the tubular filter unit body is closed by a skirted top end cap 16 which telescopes thereover, and which is provided with a central outlet opening 17 leading outwardly from the interior of the filter unit body. Respectively inserted between the ends of the filter unit body and the bottom end and top end caps thereon are sealing gaskets 18. These gaskets may be made of compressed metallic mesh, or of any other suitable material or substance not subject to deleterious attack by a fluid traversing the filter unit. The outlet opening 17 of the top end cap 16 is bridged by a spider member 19 which is adapted to be seated in an annular countersunk seating socket 20 provided in connection with means by which the filter unit is supported in use. Said spider member 19 is suitably shaped to provide discharge passages 21 with which the outlet opening 17 of said top cap communicates. A stay bolt 22 extends axially through the tubular filter unit body and the bottom end cap, top end cap and spider member assembled therewith, thus retaining these parts in assembled relation. If desired, the stay bolt 22 may be tightened to further longitudinally compress the tubular filter unit to a desired degree, so as to cause the helices of the spring member 14 to squeeze or further compress the intermediate inner discharge section 13 of the filtering medium body, whereby to close the interstitial structure of the latter to finer porosity, and thus provide greater efficiency for separating fine particle suspensions from a fluid passing therethrough.

Within the scope of this invention, one or more filter units are adapted to be mounted in a filtering apparatus between an intake chamber and an outlet chamber thereof, according to the volume of flow of fluid to be treated desired to be accommodated. In other words, the capacity of the filtering apparatus may be easily predetermined by utilizing therein a selected number of filter units.

Figure 2:
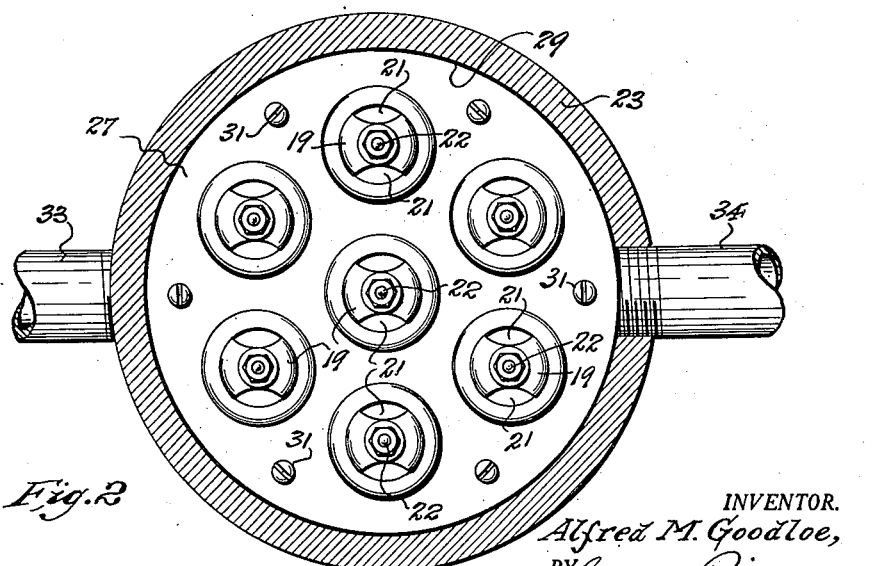

Illustrative of filtering apparatus in which the filter units are operatively incorporated, one form and construction of such apparatus is shown in Fig. 1 and 2, and comprises a housing or casing 23, the open end of which is closed by a preferably removable cover plate 24 which is secured in place by suitable fastening means, such as tap bolts 25, and sealed by an interposed suitable gasket 26. The interior of the housing or casing is divided by a partition member 27 so as to provide an intake chamber 28 and an outlet chamber 29. Said partition member is preferably removable, being seated upon an internal shoulder 30 which is suitably formed within the interior of the housing or casing 23. The partition member is secured to said shoulder 30 by suitable fastening means, such as tap screws 31. An interposed suitable gasket 32 seals the joint between the partition member and the housing or casing. Connected with the housing or casing 23, to communicate with the intake chamber 28 thereof, is a delivery pipe 33 or the like, through which fluid to be treated is supplied to said intake chamber. Also connected with the housing or casing 23, to lead outwardly from its outlet chamber 29, is a discharge pipe 34 or the like, through which filtered fluid is discharged from the apparatus. The filter units are arranged to be coupled with the partition member 27 in such manner as to be supported thereby for extension into the interior of the intake chamber 28 of the filtering apparatus, whereby the filtering medium of said filter units is exposed to reception of fluid to be treated from said intake chamber, and so that the outlet ends of said filter units communicate with the interior of the outlet chamber 29 of said filtering apparatus, through openings 17' of the partition member 27, which is interposed between the top caps 16 and spider members 19 of the filter units, said partition member having the seating socket 20 to receive the spider members 19.

In the operation of the filtering apparatus, the fluid to be treated is delivered into the intake chamber 29, and seeks outlet therefrom through the filtering medium of the filter units into the interior of the latter. In traversing the filtering medium, the fluid first encounters and passes through the outer intake section 12 thereof, and thence encounters and passes through the inner discharge section 13 thereof. Since the outer intake section 12 is of relatively coarse porosity, large solid particles of fibrous or filamentary substance suspended in the fluid will be caught by said outer intake section 12 so as to be separated from the fluid, and so as to build up over the relatively large area of exposed surface afforded by said outer intake section, without causing undue increase of resistance to onward flow of the fluid through the filtering medium. Passing said outer intake section 12, the fluid encounters and traverses the inner discharge section 13 of the filtering medium, which, due to its finer porosity or closer interstitial structure, will separate from the fluid any fine particles suspended therein, so that upon discharge of the fluid from the filtering medium into the interiors of the filter units, said fluid will be thoroughly purged of its solid suspensions, and clear filtered fluid will flow from the interiors of the filter units, through the outlet ends thereof, into the outlet chamber 29 of the filtering apparatus, to be thence discharged through the discharge pipe 34. It will therefore be understood that the graded porous texture of the filtering medium is of great advantage in assuring a non-choked flow of fluid therethrough, and a highly efficient filtering effect upon the treated fluid. It will also be understood that, in winding of the flexible linear formation of filtering medium about and onto the supporting spring member 14, the interior circumferential portions of the helices of the inner discharge section 13 will be further compressed toward the discharge surface thereof, and consequently even the interstitial structure of said inner discharge section 13 is graded toward said discharge surface to finer and finer porosity, thus further enhancing the efficiency of the filtering medium.

It may here be pointed out that the filtering medium of the filter units is very firmly and immovably supported by the helices of the spring members 14, so that the same is strongly resistant to collapse or displacement under the pressure of fluid traversing the same.

Although the helical spring supported linear formation of filtering medium herein previously described is deemed to produce a preferable form of filter unit, other forms of the filtering medium and support therefor may be provided within the scope of this invention. To exemplify this, a modified form of filter unit is shown in Fig. 7, wherein the filtering medium is provided in the form of a plurality of annular formations of substantially T-shape in cross-section. Said annular formations are so molded and compressed as to provide, in unitary relation, outer intake sections 12′ of relatively coarse porosity and inner discharge sections 13′ of relatively fine porosity. Said annular formations may be produced from compressed knitted, woven or felted metallic, textile or synthetic filamentary or fibrous material, but preferably from a compressed knitted metallic wire fabric. To support said annular formations of filtering medium in a tubular filter unit forming structure, the same are interposed between rigid rings 14′ of metal or other suitable material, with the inner discharge sections 13′ engaged between opposed faces of adjacent rings, and with the outer intake sections 12′ disposed externally of said rings so as to span adjacent rings between which the inner discharge sections 13′ are disposed. A suitable number of said annular formations of the filtering medium alternated with supporting rings 14′ are assembled together in columnar relation so as to provide a tubular filter unit body. The body so formed is closed at one end by a bottom end cap 15, and at its opposite end by a top cap 16 having an outlet opening 17 and equipped with a spider member 19, as in the previously described filter unit structure. The assembly of filter unit body, bottom end cap, top end cap and spider member is retained in filter unit forming relation and in supported connection with the partition member 27 of a filtering apparatus by an axial stay bolt 22, also as in the previously described filter unit structure. It will be obvious that this modified form of filter unit is adapted to be incorporated in filtering apparatus in the same manner, and so as to function in the same way, as set forth with respect to said previously described filter unit structure.

Having now described my invention, I claim:

1. A hollow filter unit for incorporation in filtering apparatus intermediate intake and outlet chambers thereof comprising a tubular body the wall of which is formed by supporting means provided by a helical spring member, and foraminous filtering means provided by a preshaped linear formation of compressed metallic filamentary or fibrous material of substantially T-shape cross-section to provide intake portions of relatively coarse porosity and discharge portions of relatively fine porosity, said filtering material being wound about and along the supporting spring members, with said discharge portions being gripped between helices of the latter, and with said intake portions externally spanning said helices along the exterior face of the tubular body, and means to close opposite ends of said tubular body, one of which is provided with an outlet passage leading from the interior of said tubular body.

2. A hollow filter unit for incorporation in filtering apparatus intermediate intake and outlet chambers thereof comprising a tubular body the wall of which is formed by supporting means provided by a helical spring member, and foraminous filtering means provided by a preshaped linear formation of compressed metallic filamentary material of substantially T-shape cross-section to provide intake portions of relatively coarse porosity and discharge portions of relatively fine porosity, said filtering material being wound about and along the supporting spring member, with said discharge portions being gripped between helices of the latter, and with said intake portions externally spanning said helices along the exterior face of the tubular body, and means to close opposite ends of said tubular body, one of which is provided with an outlet passage leading from the interior of said tubular body, and an axial stay bolt to secure said body and end closing means in assembled relation.

3. A hollow filter unit for incorporation in filtering apparatus intermediate intake and outlet chambers thereof comprising a tubular body the wall of which is formed by supporting means provided by a helical spring member, and filtering means provided by a linear formation of molded and compressed knitted metallic wire fabric, wherein knit loop filaments of said fabric are interentangled and consolidated into a foraminous wall structure of substantially T-shape in cross-section to provide outer intake portions of relatively coarse porosity and inner discharge portions of relatively fine porosity, said filtering material being wound about and along the supporting spring member, with said discharge portions gripped between helices of the latter, and with said intake portions externally spanning said helices along the exterior face of the tubular body, and means to close opposite ends of said tubular body, one of which is provided with an outlet passage leading from the interior of said tubular body.

4. A hollow filter unit for incorporation in filtering apparatus intermediate intake and outlet chambers thereof comprising a tubular body the wall of which is formed by supporting means provided by a helical spring member, and filtering means provided by a linear formation of molded and compressed knitted metallic wire fabric, wherein knit loop filaments of said fabric are interentangled and consolidated into a foraminous wall structure of substantially T-shape in cross-section to provide outer intake portions of relatively coarse porosity and inner discharge portions of relatively fine porosity, said filtering material being wound about and along the supporting spring member, with said discharge portions gripped between helices of the latter, and with said intake portions externally spanning said helices along the exterior face of the tubular body, means to close opposite ends of said tubular body, one of which is provided with an outlet passage leading from the interior of said tubular body, and an axial staybolt to secure said body and end closing means in assembled relation.

5. Filtering apparatus comprising a casing having a partition subdividing its interior into an intake chamber and an outlet chamber, said casing having means to supply fluid to be treated to its intake chamber and means to discharge said fluid from its outlet chamber, and at least one hollow filter unit supported by said partition for extension into said casing intake chamber with an end thereof communicating with said casing outlet chamber, said filter unit comprising a tubular body the wall of which is formed by supporting means provided by a helical spring member, and foraminous filtering means provided by a preshaped linear formation of compressed metallic filamentary material of substantially T-shape cross-section to provide intake portions of relatively coarse porosity and discharge portions of relatively fine porosity, said filtering material being wound about and along the supporting spring member, with said discharge portions gripped between helices of the latter, and with said intake portions externally spanning said helices along the exterior face of the tubular body, means to close opposite ends of said tubular body, one of which is provided with an outlet passage leading from the interior of said tubular body, and an axial staybolt to secure said tubular body and end closing means in assembled relation.

6. Filtering apparatus comprising a casing having a partition subdividing its interior into an intake chamber and an outlet chamber, said casing having means to supply fluid to be treated to its intake chamber and means to discharge said fluid from its outlet chamber, and at least one hollow filter unit supported by said partition for extension into said casing intake chamber with an end thereof communicating with said casing outlet chamber, said filter unit comprising a tubular body the wall of which is formed by supporting means provided by a helical spring member, and foraminous filtering means provided by a linear formation of molded and compressed knitted metallic wire fabric wherein knit loop filaments of said fabric are interentangled and consolidated into a foraminous wall structure of substantially T-shape in cross-section to provide outer intake portions of relatively coarse porosity and inner discharge portions of relatively fine porosity, said filtering material being wound about and along the supporting spring member, with said discharge portions gripped between helices of the latter, and with said intake portions externally spanning said helices along the exterior face of the tubular body, means to close opposite ends of said tubular body, one of which is provided with an outlet passage leading from the interior of said tubular body, and an axial staybolt to secure said tubular body and end closing means in assembled relation.

References Cited in the file of this patent

UNITED STATES PATENTS

| | | |
|---|---|---|
| 904,649 | Ruff | Nov. 24, 1908 |
| 1,750,935 | Maunula et al. | Mar. 18, 1930 |
| 2,401,039 | Bauer | May 28, 1946 |
| 2,455,486 | Hicks | Dec. 7, 1948 |
| 2,672,214 | Goodloe | Mar. 16, 1954 |

FOREIGN PATENTS

| | | |
|---|---|---|
| 10,577 | Great Britain | of 1885 |
| 683,227 | Great Britain | Nov. 26, 1952 |
| 400,030 | Italy | Nov. 23, 1942 |